Jan. 26, 1937.  F. G. BOVARD  2,068,941
PROCESS AND APPARATUS FOR MANUFACTURING INSULATORS
Filed Aug. 29, 1934
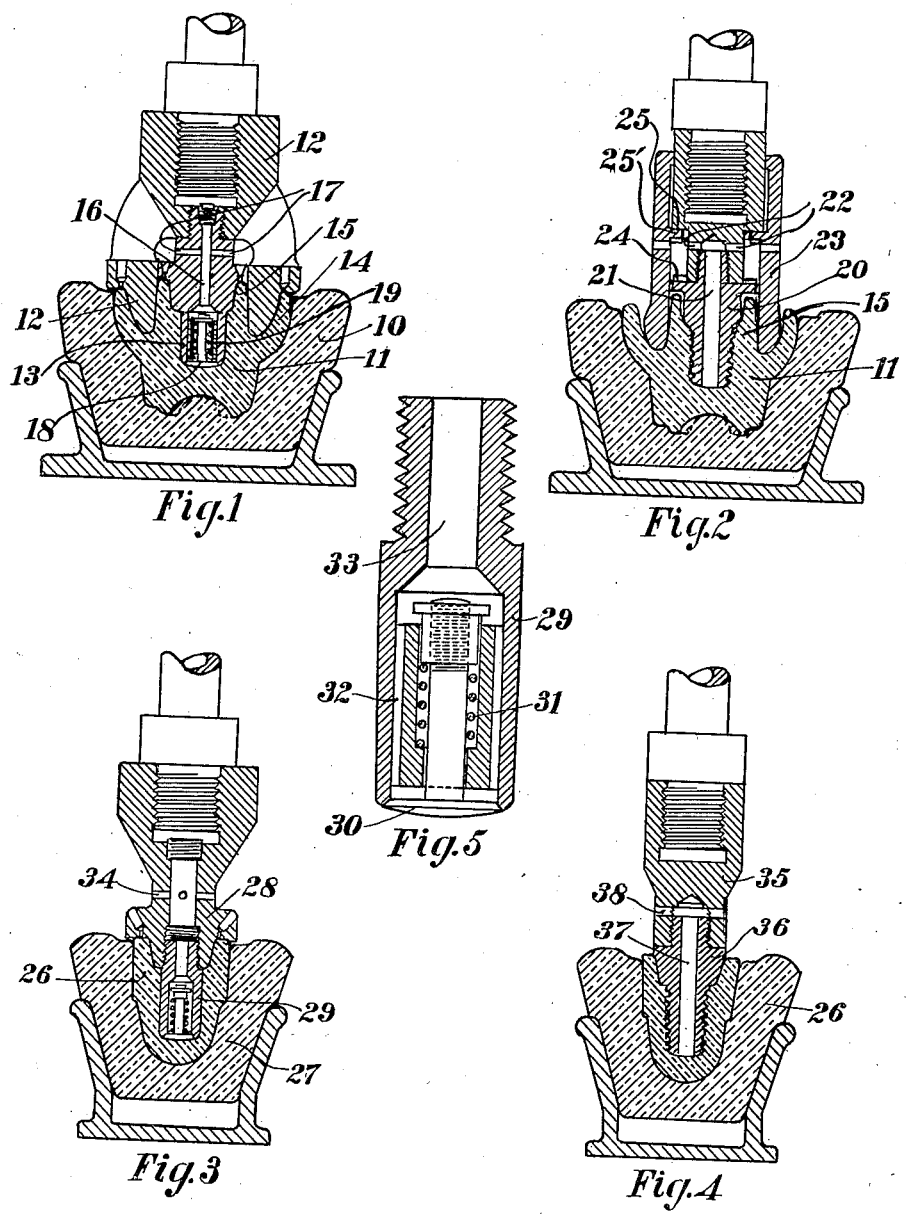
INVENTOR
Floyd G. Bovard
BY
ATTORNEY Patented Jan. 26, 1937

2,068,941

UNITED STATES PATENT OFFICE 2,068,941

PROCESS AND APPARATUS FOR MANUFACTURING INSULATORS

Floyd G. Bovard, Akron, Ohio, assignor to The Ohio Brass Company, Mansfield, Ohio, a corporation of New Jersey Application August 29, 1934, Serial No. 741,983

12 Claims. (Cl. 25—3)

This invention relates to a process and apparatus for manufacturing insulators from plastic material, such as porcelain, and has special reference to the formation of threaded pin holes in the plastic material.

One object of the invention is to provide a process and apparatus in which more accurate threads may be formed in the pin holes.

A further object of the invention is to provide a process and apparatus which will insure more satisfactory results with less danger of defective pieces due to variations in the conditions of operation.

A further object of the invention is to provide an improved process for manufacturing insulators and apparatus for performing said process which shall be of improved construction and operation.

Other objects and advantages will appear from the following description.

The invention is exemplified by the combination and arrangement of parts shown in the accompanying drawing and described in the following specification, and it is more particularly pointed out in the appended claims.

In the drawing:

Fig. 1 is a vertical section of one form of apparatus for performing one step of the process according to the present invention.

Fig. 2 is a view similar to Fig. 1 showing a different portion of the apparatus for performing another step of the process.

Figs. 3 and 4 are views similar to 1 and 2 respectively showing a slightly different form of apparatus for practicing the invention on another style of insulator.

Fig. 5 is a vertical section on a larger scale showing one part of the apparatus.

In the formation of pin type insulators from plastic material, such as porcelain clay, it is common practice to form the clay in molds of plaster Paris or other suitable material, the clay being pressed into the mold by means of a plunger which at the same time forms a recess in the insulator for receiving the supporting pin and also forms flanges or petticoats to impart special shapes to the bottom portion of the insulator. It has also been common practice to provide the plunger with a threaded tip which is given a rotary movement at the same time that it is fed into the plastic material to form a threaded pin hole in the formed piece. During withdrawal of the plunger, it is given a reverse rotation so that it is unscrewed, leaving the formed threads in the pin hole. In order that air may enter the pin hole as the plunger is withdrawn, the plunger is provided with a central bore that is closed by means of a valve at its lower end to exclude the clay when the plunger is forced into the material. This valve opens as the plunger is withdrawn to prevent the formation of a vacuum within the pin hole. Operation of a device of this kind requires constant diligence and accurate apparatus to prevent distortion of the formed threads. Any inequality of pressure between the interior of the pin hole and the outer atmosphere during withdrawal of the plunger tends to distort the threads and prevent accurate work.

In the present invention this difficulty is overcome by first forming the piece with an unthreaded opening for the pin hole. The plunger is made of just the correct size to leave sufficient clay to form the threads, i. e., it will be of a diameter approximately equal to the mean diameter of the finished threads so that the excess clay forced out of the roots of the threads will be just sufficient to form the tips. After the first operation in which the insulator is completed, except for the threads in the pin hole, a threading die or plunger is inserted into the opening formed by the first plunger; the second plunger having the threads formed on its outer surface. The second plunger is, of course, rotated as it is fed into the pin hole; the rotation being at the proper rate relative to the feeding movement to form the threads on the inside of the pin hole. For a single thread, which is the form commonly used, the plunger will be fed forward a distance equal to the pitch of the thread for each revolution of the plunger; and after the threading die has reached the limit of its movement so as to extend the thread to the bottom of the pin hole, the direction of rotation and the direction of longitudinal movement will be simultaneously reversed and the die unscrewed from the pin hole. The die is provided with a vent opening extending from the end thereof to a point open to the atmosphere. This will keep the interior of the pin hole constantly in communication with the atmosphere so that there can be no difference of pressure to distort the threads. Since the opening for the pin hole is preformed, there will be no excess clay to enter the vent in the plunger and consequently no valve is required for closing the end of the vent.

Where a valve is used, as in the previous practice, there must be at least some unbalanced pressure to open the valve upon withdrawal of the plunger. This may be partially overcome by introducing a heating medium which will enter the space beneath the plunger, but there is always difficulty in securing an even balance of the pressure above and below the plunger where the vent is provided with a valve. In the present invention, during the threading operation, there is always an unobstructed passage between the interior of the pin hole and the outer atmosphere so that there can be no distortion of the thread due to any unbalanced pressure.

Referring to the drawing, the numeral 10 designates any suitable mold in which the plastic material 11 is placed. The plunger 12 is moved down to engage the plastic material and form its upper surface in a manner well known in the art. The plunger may be rotated if desired during the forming operation and may be properly heated by any suitable method, and the surface of the clay may be lubricated to prevent the plunger from adhering to the clay.

In Fig. 1 the plunger is provided with a circular rim 12 and a central member 13. The member 13 forms the opening for the pin hole while the member 12 cooperates with the mold and the central member for forming flanges or petticoats 14 and 15. The plunger 13 is provided with a vent 16 which communicates at its upper end with the open atmosphere at 17. The lower end of the passage 16 is closed by a valve 18 which is held in its closed position by means of a spring 19. Upon withdrawal of the plunger, the valve 18 opens to permit air to enter the space beneath the valve. After the plunger shown in Fig. 1 has been removed, the work piece thus formed is shifted to the second position where the plunger shown in Fig. 2 enters the preformed opening and forms the threads on the interior of the pin hole.

The plunger 20 in Fig. 2 has its outer surface threaded, as shown in that figure, and is provided with a vent 21 communicating with the atmosphere at 22. The lower end of the vent is open so as to provide free communication between the interior of the pin hole and the atmosphere at all times. As the plunger 20 is moved into place on the pin hole, it is of course rotated at the proper relative speed to form the threads; and when the end of the plunger reaches the bottom of the pin hole, the direction of movement and the direction of rotation are simultaneously reversed so that the plunger is unscrewed from the pin hole. The opening formed by the previous step in the operation is of just the right size so that there is sufficient clay to fill the grooves of the thread in the plunger, forming full rounded threads in the interior of the pin hole.

Where the work piece is provided with a flange which is not supported by the mold, as the flange 15, it is sometimes desirable to provide means for backing up this flange so as to hold the clay firmly against the plunger. Otherwise, the clay might yield outwardly so that full rounded threads would not be formed in the part of the hole surrounded by the flange. For this purpose, a sleeve 23 is provided which is free to slide for a limited distance on the plunger 20, the amount of movement being limited by the shoulders 24 and 25 respectively.

The sleeve 23 is provided with an inwardly projecting flange 25' which rests on the shoulder 24 as the plunger moves downwardly until the bottom edge of the sleeve engages the groove in the work piece 11. The plunger then continues to move downwardly to form a thread and at the extremity of its movement the shoulder 25 engages the stop 25' to make sure that the sleeve is completely seated at the time that the plunger reaches the extremity of its movement. This will hold the clay in the flange 15 firmly against the plunger so that the threads will be well formed. The sleeve 23 will remain in position during the reverse movement of the plunger to hold the clay in place until the plunger is withdrawn from the threaded portion of the pin hole. When the shoulder 24 engages the lower face of the stop 25', the rotation of the plunger will be imparted to the sleeve 23 to break adhesion between the sleeve and the clay. The shoulder 24 and the lower face of the flange 25' may be provided with intermeshing teeth to insure rotation of the sleeve at this time.

In the formation of insulators in which the entire pin hole is backed up by the mold, the backing sleeve 23 will not be required. In Figs. 3, 4 and 5, plungers for this form of insulator are shown. Fig. 3 shows the preliminary forming operation in which the clay 26 is held by mold 27 and formed by a plunger 28. The plunger 28 is provided with a detachable tip 29, shown on a larger scale in Fig. 5. The tip 29 is provided with a valve 30 for closing its lower end, the valve being held in closed position by a spring 31. A series of ducts 32 connect the end of the valve with the vent 33 which communicates with the atmosphere at 34 when the tip is in place in the plunger. The thread forming plunger 35 is provided with a detachable tip 36 having its end threaded to form the threads in the pin hole and having an open passage 37 communicating at 38 with the outer atmosphere. The operation of this form of the invention is similar to that described in connection with Figs. 1 and 2 except that there is no backing sleeve used with the apparatus shown in Figs. 3 and 4.

I claim:

1. The method of forming a threaded opening in plastic material which comprises the steps of first forming an unthreaded opening in said material and then feeding a threading die into said unthreaded opening, maintaining the outer surface of said threading die in contact with the inner surface of said opening entirely around the periphery of said opening during said feeding operation and thus substantially preventing escape of air between the outer surface of said threading die and the inner surface of said opening pressing the material of the wall of said opening into thread formation by means of said die and venting said opening to atmosphere through said threading die during the entrance and removal of said die.

2. The method of forming a threaded opening in plastic material comprising the steps of first forming an unthreaded opening in said material of approximately the mean diameter of the threaded opening to be formed and then feeding a threading die into said opening, maintaining the outer surface of said threading die in contact with the inner surface of said opening entirely around the periphery of said opening during said feeding operation and thus substantially preventing escape of air between the outer surface of said threading die and the inner surface of said opening and forming the material of the walls of said opening into thread formation by means of said die, unscrewing the die from the threaded opening thus formed and maintaining atmospheric pressure within said opening during the insertion and removal of said die the axis of said die being maintained in coincidence with the axis of said opening during the insertion and removal of said die.

3. The method of forming an insulator from plastic material comprising the steps of placing the material in a mold, pressing said material into shape by means of a die and forming a recess in said material, withdrawing the die, feeding a threading die into said recess, maintaining the outer surface of said threading die in contact with the inner surface of said opening entirely around the periphery of said opening during said feeding operation and thus substantially preventing escape of air between the outer surface of said threading die and the inner surface of said opening and forming the material of the wall of said recess into thread formation by said threaded die and maintaining atmospheric pressure in said recess during insertion and removal of said threading die.

4. The method of forming an insulator of plastic material comprising the steps of placing the material in a mold, pressing a plunger into said material and thereby forming a recess, withdrawing the plunger, feeding a threading die into the recess formed by said plunger, maintaining close contact between the outer surface of said threading die and the inner surface of said recess around the entire periphery of said die and recess during said feeding operation and thus substantially preventing escape of air between said surfaces and pressing the material of the wall of said recess into thread formation by said threading die and maintaining free communication between the interior of said recess and the outer atmosphere during the insertion and withdrawal of said threading die.

5. The method of forming an insulator from plastic material comprising the steps of placing the material in a mold and forming therein a recess having a portion thereof surrounded by a flange spaced away from said mold, feeding a threading die into said recess after the formation of said recess and flange and pressing the material of the wall of said recess including a portion of the interior wall of said flange into thread formation by said die and backing up the flange portion of the wall of said recess during the threading operation thereof to prevent distortion thereof by said threading operation.

6. The method of forming threads in a plastic body comprising the steps of forming an opening in the material of said body of approximately the mean diameter of the thread to be formed, thereafter feeding a threading die into said opening and forming the material of the wall of said opening into thread formation by means of said die, and backing up the material of said wall during the threading formation to hold the material against said threading die.

7. The method of forming an insulator from plastic material comprising the steps of forming said material in a mold into an insulator shape having a central bore and a flange surrounding a portion of said bore, the outer periphery of which flange is spaced from said mold, backing the outer periphery of said flange, feeding a threading die into said opening while said flange is backed to prevent the material of said flange from backing away from said threading die, and unscrewing said threading die from said opening.

8. The method of forming an insulator comprising the steps of placing plastic material in a mold, pressing a die against the material in said mold and thereby forming a recess in said material surrounded by a flange, the outer periphery of which flange is unsupported laterally, removing said die, and thereafter screwing a threading die into said recess and forming the material of the walls of said recess into thread formation and at the same time engaging the outer periphery of said flange to prevent the material of said flange from backing away from said threading die during the threading operation.

9. Apparatus for manufacturing an insulator comprising a mold, a preforming die for engaging plastic material in said mold, said die having a plunger for forming a recess in said material and a threading die adapted to engage the recess formed by said plunger, said plunger having a diameter approximately equal to the mean diameter of the threads on said threading die, said threading die having a passage therein connecting the end thereof with the atmosphere.

10. Means for forming a thread in an opening in a plastic body comprising a threading die having an unobstructed vent extending from the end thereof to the open atmosphere.

11. Mechanism for forming threads in a plastic body comprising a preforming plunger for forming a preliminary recess in said body, a die member having external threads thereon and having an unobstructed vent extending from the end thereof to the open atmosphere, a sleeve surrounding said die and movable longitudinally thereof and means for inserting said preforming plunger and said die successively into said body.

12. Means for forming in a plastic body comprising a plunger having a recess forming portion and means for forming a flange surrounded by a groove about said recess, a threading die for entering the recess in said body to form the material of the wall of said recess into thread formation, a sleeve surrounding said die and movable longitudinally thereof into position in said groove to back up the material about said recess, said threading die being movable into and out of said recess while said sleeve remains stationary, and means for positively locating said sleeve longitudinally of said die when said die is at the extremity of its movement into said recess.

FLOYD G. BOVARD.